US012773658B2

(12) United States Patent
Kubitz et al.

(10) Patent No.: US 12,773,658 B2
(45) Date of Patent: Oct. 27, 2026

(54) MEDICAL FILTRATION DEVICE AND SYSTEMS

(71) Applicant: Green Ladder Technologies, LLC, Batavia, IL (US)

(72) Inventors: Ken Kubitz, Elburn, IL (US); Timothy Austin, Scotts, MI (US)

(73) Assignee: GREEN LADDER TECHNOLOGIES, LLC, Batavia, IL (US)

( * ) Notice: Subject to any disclaimer, the term of this patent is extended or adjusted under 35 U.S.C. 154(b) by 253 days.

(21) Appl. No.: 18/348,318

(22) Filed: Jul. 6, 2023

(65) Prior Publication Data

US 2024/0009612 A1 Jan. 11, 2024

Related U.S. Application Data

(60) Provisional application No. 63/358,645, filed on Jul. 6, 2022.

(51) Int. Cl.

| | |
|---|---|
| ***B01D 53/02*** | (2006.01) |
| ***B01D 46/12*** | (2022.01) |
| ***B01D 46/44*** | (2006.01) |
| ***B01D 46/62*** | (2022.01) |

(52) U.S. Cl.

CPC ............. *B01D 46/62* (2022.01); *B01D 46/12* (2013.01); *B01D 46/442* (2013.01); *B01D 2267/40* (2013.01); *B01D 2271/027* (2013.01); *B01D 2273/28* (2013.01); *B01D 2279/20* (2013.01)

(58) Field of Classification Search

CPC .......... B01D 2267/40; B01D 2271/027; B01D 2273/28; B01D 2279/20; B01D 46/0036; B01D 46/12; B01D 46/442; B01D 46/62

See application file for complete search history.

(56) References Cited

U.S. PATENT DOCUMENTS

| | | | | | |
|---|---|---|---|---|---|
| 4,444,575 | A * | 4/1984 | Miller | B01D 46/12 | 55/318 |
| 4,619,672 | A * | 10/1986 | Robertson | B01D 46/10 | 55/318 |
| 4,735,603 | A * | 4/1988 | Goodson | A61M 13/006 | 606/14 |
| 4,826,513 | A * | 5/1989 | Stackhouse | B01D 50/00 | 96/131 |
| 4,963,134 | A * | 10/1990 | Backscheider | A61M 1/79 | 55/467 |
| 5,047,072 | A * | 9/1991 | Wertz | A61L 9/20 | 96/131 |
| 5,108,474 | A * | 4/1992 | Riedy | B01D 46/12 | 55/497 |
| 5,242,474 | A * | 9/1993 | Herbst | A61B 18/00 | 55/467 |

(Continued)

*Primary Examiner* — Christopher P Jones

(74) *Attorney, Agent, or Firm* — Fredrikson & Byron, P.A.

(57) ABSTRACT

Provided are filtration devices, including medical filtration devices, for operating within a vacuum unit. The filtration system removes particulate matter, including smoke, volatile compounds, and long chain organic compounds. The construction of the filtration system is within a single filter housing allowing for ease of construction and a single potting versus multiple potting's. The filtration system contains a hermetic seal to achieve a lower probability of seal failure versus processes that require multiple potting's.

19 Claims, 12 Drawing Sheets

(56) References Cited

U.S. PATENT DOCUMENTS

| | | | | |
|---|---|---|---|---|
| 6,576,033 | B1 * | 6/2003 | Booth | B01D 46/0038 428/36.1 |
| 6,746,504 | B2 * | 6/2004 | Booth | B01D 46/58 428/36.1 |
| 8,685,152 | B2 * | 4/2014 | Eschlbeck | F02M 25/0854 95/146 |
| 9,333,451 | B2 * | 5/2016 | Lay | F02M 37/42 |
| 10,631,916 | B2 * | 4/2020 | Horner | A61B 18/14 |
| 10,758,856 | B2 * | 9/2020 | Horner | A61B 18/00 |
| 11,559,621 | B2 * | 1/2023 | Wierzba | A61B 18/1206 |

* cited by examiner

MEDICAL FILTRATION DEVICE AND SYSTEMS

CROSS-REFERENCE TO RELATED APPLICATION(S)

This application claims the benefit under 35 U.S.C. § 119(e) to U.S. Provisional Application 63/358,645, filed Jul. 6, 2022, and entitled "MEDICAL FILTRATION DEVICE AND SYSTEMS," which is incorporated herein by reference in its entirety for all purposes.

TECHNICAL FIELD

The various embodiments herein relate to medical filtration devices and systems, including, but not limited to, multi-layer filtration systems for use within a vacuum system to filter liquid-vapor, smoke, fluidized particulate contamination, and volatile organic compounds.

BACKGROUND

Medical procedures often involve the use of various instruments, devices, and equipment that generate fluidized particulate contaminates or byproducts, including liquid-vapor, smoke, and volatile organic compounds. For example, the smoke, commonly referred to as surgical smoke or plume, contains a wide range of hazardous substances, including toxic gases, carcinogens, and other harmful contaminants. When inhaled, these harmful components can pose significant health risks to both healthcare professionals and patients present in the operating room or clinical setting. The existing filtration systems used to capture and remove smoke particles during medical procedures have several limitations, including inadequate filtration efficiency, cumbersome setup, and limited versatility.

Conventional filter evacuation systems in medical settings typically require individual evaluation of each component of the filtration system and fails to provide a hermetically sealed filtration system due to each individualized component. Further, conventional filtration systems rely on simple suction devices or passive filtration methods, which often lack the necessary effectiveness in removing the diverse array of hazardous particles present in surgical smoke. Such filter systems are not designed to handle the complexity and diversity of medical procedures, which can generate different types and sizes of smoke particles. Moreover, the existing systems may not be adaptable to various medical devices and other non-medical instruments, limiting their overall effectiveness and versatility.

There remains a need for medical filtration systems that provide efficient filtration, adaptability to various medical devices and instruments, and ease of assembly.

SUMMARY

In Example 1, a medical air filtration device comprises:

(a) a main body comprising:

(i) a main body lumen defined through the main body;

(ii) a sensor receiving housing disposed within the lumen; and (iii) a coupling structure disposed at an end of the main body; and (b) a filter body comprising:

(i) a filter body lumen defined through the filter body;

(ii) a particulate filter disposed within the filter body lumen; and (iii) at least one matrix filter disposed within the filter body lumen adjacent the particulate filter, wherein the filter body is removably coupleable with the coupling structure at a first end of the filter body such that the main body is fluidically sealed to the filter body and the filter body lumen is in fluidic communication with the main body lumen.

Example 2 relates to the medical air filtration device according to Example 1, wherein the filter body further comprises a gasket fluidically sealed to a second end of the filter body.

Example 3 relates to the medical air filtration device according to Example 2, further comprising an outer housing configured to receive the main body and the filter body, wherein the gasket is configured to provide a fluidic seal between the second end of the filter body and the outer housing.

Example 4 relates to the medical air filtration device according to Example 1, wherein the at least one matrix filter is disposed downstream of the particulate filter.

Example 5 relates to the medical air filtration device according to Example 1, wherein the at least one matrix filter comprises three matrix filters disposed adjacent to each other in the filter body lumen.

Example 6 relates to the medical air filtration device according to Example 1, further comprising a liquid filter disposed in the main body.

Example 7 relates to the medical air filtration device according to Example 1, further comprising a remaining dust filter disposed in the filter body lumen downstream of the at least one matrix filter.

Example 8 relates to the medical air filtration device according to Example 1, wherein the at least one matrix filter is an organic components filter.

Example 9 relates to the medical air filtration device according to Example 1, further comprising:

(a) a sensor wire operably coupled to the sensor receiving housing, wherein the sensor wire extends out of the main body; and (b) a connection component disposed on the filter body, wherein the sensor wire is coupleable to the connection component.

Example 10 relates to the medical air filtration device according to Example 1, wherein the particulate filter and the at least one matrix filter are configured to remove particulates, volatile organic compounds, and long chain organic compounds from air passing through the device.

Example 11 relates to the medical air filtration device according to Example 1, wherein the device is configured to be coupleable to and operable with a medical vacuum system.

Example 12 relates to the medical air filtration device according to Example 1, wherein the filter body comprises a plastic material or polymeric material.

In Example 13, a Medical Air Filtration Device Comprises:

(a) a main body comprising:

(i) a main body lumen defined through the main body;

(ii) a sensor receiving housing disposed within the lumen;

(iii) a liquid filter disposed within the lumen; and (iii) a coupling structure disposed at an end of the main body; and (b) a filter body comprising:

(i) a filter body lumen defined through the filter body;

(ii) a particulate filter disposed within the filter body lumen;

(iii) at least two organic component filters disposed within the filter body lumen adjacent to and downstream of the particulate filter; and (iv) a dust filter disposed within the filter body lumen adjacent to and downstream of the at least two organic component filters, wherein the filter body is removably coupleable with the coupling structure at a first end of the filter body such that the main body is fluidically sealed to the filter body and the filter body lumen is in fluidic communication with the main body lumen.

Example 14 relates to the medical air filtration device according to Example 13, further comprising:

(a) a gasket fluidically sealed to a second end of the filter body; and (b) an outer housing configured to receive the main body and the filter body, wherein the gasket is configured to provide a fluidic seal between the second end of the filter body and the outer housing.

Example 15 relates to the medical air filtration device according to Example 13, further comprising:

(a) a sensor wire operably coupled to the sensor receiving housing, wherein the sensor wire extends out of the main body; and (b) a connection component disposed on the filter body, wherein the sensor wire is coupleable to the connection component.

Example 16 relates to the medical air filtration device according to Example 13, wherein the particulate filter, the at least two organic component filters, and the dust filter are configured to remove particulates, volatile organic compounds, and long chain organic compounds from air passing through the device.

In Example 17, a Medical Vacuum and Filtration System Comprises:

(a) a medical suction device comprising a hose; and (b) an air filtration device comprising:

(i) an outer housing;

(ii) a main body disposed within the outer housing, the main body comprising:

(A) a main body lumen defined through the main body;

(B) a sensor receiving housing disposed within the main body lumen; and (C) a coupling structure disposed at an end of the main body, wherein the hose is operably coupled to the main body such that an interior of the hose is in fluidic communication with the main body lumen; and (iii) a filter body disposed within the outer housing, the filter body comprising:

(A) a filter body lumen defined through the filter body;

(B) a particulate filter disposed within the filter body lumen; and (C) at least one matrix filter disposed within the filter body lumen adjacent the particulate filter, wherein the filter body is removably coupleable with the coupling structure at a first end of the filter body such that the main body is fluidically sealed to the filter body and the filter body lumen is in fluidic communication with the main body lumen.

Example 18 relates to the medical vacuum and filtration system according to Example 17, further comprising:

(a) a liquid filter disposed in the main body; and (b) a dust filter disposed in the filter body lumen downstream of the at least one matrix filter.

Example 19 relates to the medical vacuum and filtration system according to Example 17, wherein the at least one matrix filter comprises three matrix filters disposed adjacent to each other in the filter body lumen, wherein the three matrix filters are organic components filters.

Example 20 relates to the medical vacuum and filtration system according to Example 17, further comprising a gasket fluidically sealed to a second end of the filter body, wherein the gasket is configured to provide a fluidic seal between the second end of the filter body and the outer housing.

While multiple embodiments are disclosed, still other embodiments of the present disclosure will become apparent to those skilled in the art from the following detailed description, which shows and describes illustrative embodiments of the disclosure. Accordingly, the figures and detailed description are to be regarded as illustrative in nature and not restrictive.

DETAILED DESCRIPTION

The various embodiments herein relate to filtration devices and systems for filtering materials including, but not limited to, liquid-vapor, smoke, fluidized particulate contamination, and volatile organic compounds. The various embodiments have a filter that is capable of being utilized within a vacuum system. In certain embodiments, the filter is a medical filter. In other embodiments, the filter may be used in any vacuum system in which fluidized particulate contamination may be present. The filtration device and systems are capable of nanofiltration while removing volatile chemicals, as well as odors. In some aspects, the filtration device and systems can remove substances including, but not limited to, biological organisms, blood, plasma, microorganisms, viruses, and structured proteins.

In accordance with certain embodiments, the filtration device and systems comprise of a multi-layer filtration system that is both modular and flexible for a range of medical filtration needs. Examples of medical filtration uses include, but are not limited to, filtration of biological fluids in accordance with a surgical procedure, filtration of biological fluids in accordance with a medical procedure, and separation of biological fluids to concentrate a protein fraction. In additional aspects, the filtration device and systems of the present disclosure may be used with medical procedures by entrapment of the vapor, smoke, fluidized particulate contamination, volatile organic compounds, biological components, or a combination thereof. In embodiments, these components include, but are not limited to, the smoke, volatile biological or organic vapor fraction generated with the sealing of a wound during a surgical and/or medical procedure. Additional uses may be those known to those of skill in the art. In embodiments, additional features may be provided to reduce cost, improve performance, and improve ease of the assembly of the filter system.

Figure 1:
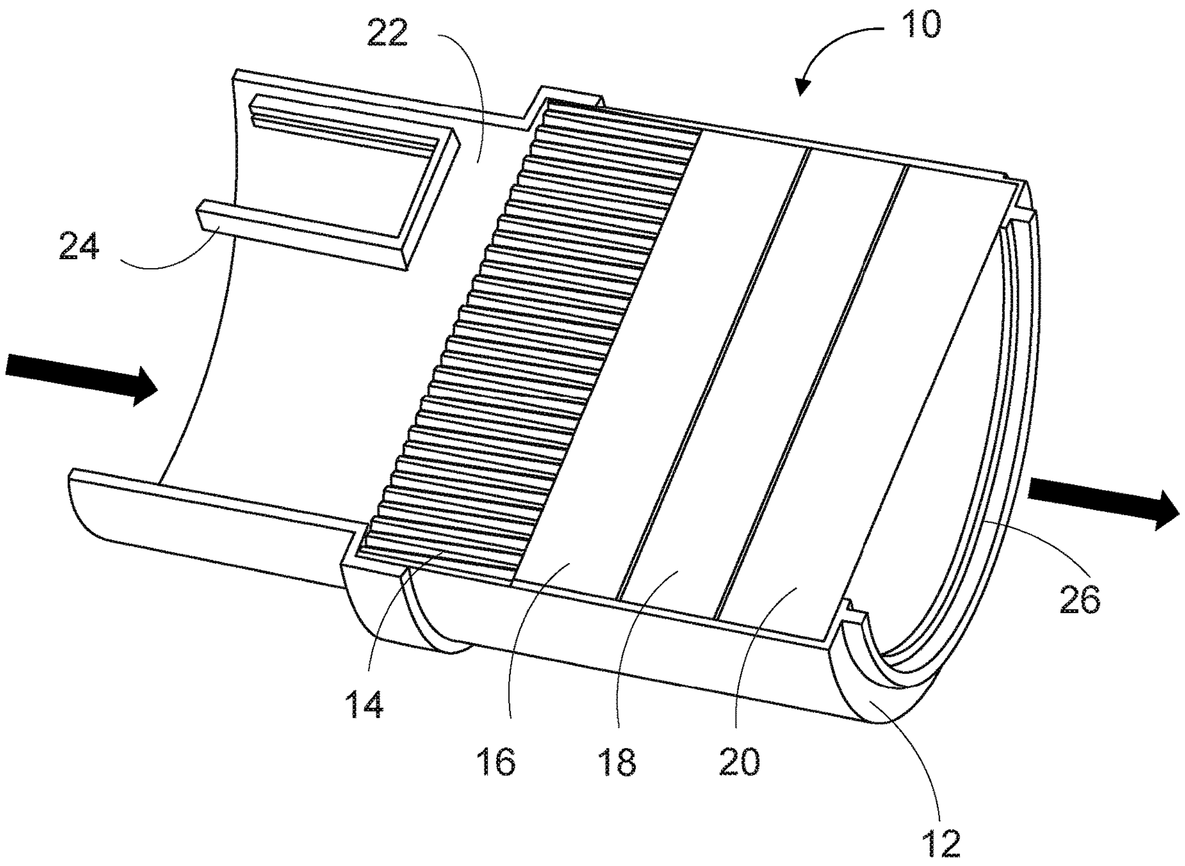
FIG. 1 is a perspective cross-sectional view of a filter system having four series of filters, according to one embodiment. The interior filter is designed for particulate filtration and the three remaining filters are matrix filters capable of separating organic components within a vacuum stream represented by the arrows within the figure.

FIG. 1 depicts a filter system or filtration device 10 according to one embodiment. In some aspects, the filter system 10 comprises a filter housing or filter body 12. In aspects, the filter body comprises a filter body lumen defined through the filter body. In certain embodiments, a gasket 26 is coupled to and fluidically sealed or hermetically sealed to the filter housing or filter body 12. In further aspects, the filter system 10 comprises a main housing or main body 22. FIG. 1 provides an embodiment of the filter system having a round or circular structure, however, alternative embodiments are further considered, including, but not limited to, a square, rectangular, or elliptical shape. In certain embodiments, the filter system 10 is inserted within a vacuum manifold for vacuum filtration. In some examples, the filter system 10 is configured to be coupleable to and operable with a medical vacuum system (not shown in the figures).

FIG. 1 further depicts the filter system 10 according to one embodiment, wherein the filter housing or filter body 12 may be snapped together with the main housing or main body 22 via a coupling structure disposed at an end of the main body 22. This snap together feature allows for ease of assembly of the filter system 10 and prevents fluid by-pass. In embodiments, the filter body is removably coupleable with a coupling structure at a first end of the filter body such that the main body is fluidically sealed to the filter body and the filter body lumen is in fluidic communication with the main body lumen. Beneficially, the filter body 12 comprises a plastic or polymeric material which encloses filters as further described herein. The coupling of the filter body 12 and main body 22 provide a fluidically sealed or hermetically sealed filtration system. In some aspects, the filter body 12 does not require the use of cardboard to form the fluidically sealed filtration system. In aspects, the disclosed filter system provides for the placement of filters within a single filter housing or filter body 12. This configuration allows for a single potting step to prevent bypass when the gasket 26 is over-molded to the filter housing or filter body 12. In certain aspects, the over-molded gasket 26 is fluidically sealed or hermetically sealed to a second end of the filter housing or filter body 12. Beneficially, the hermetic seal achieves a lower probability of seal failure versus a process that requires multiple pottings. In some embodiments, the gasket is further attached to an outer housing (not shown in FIG. 1; See outer housing 46 in FIG. 6 and FIG. 10). The outer housing 46 may enclose the entire filter system 10 and may be configured to fit into a larger system, such as, for example, the vacuum system as further discussed herein. In some embodiments, the outer housing 46 may be substantially rectangular or square.

Figure 2:
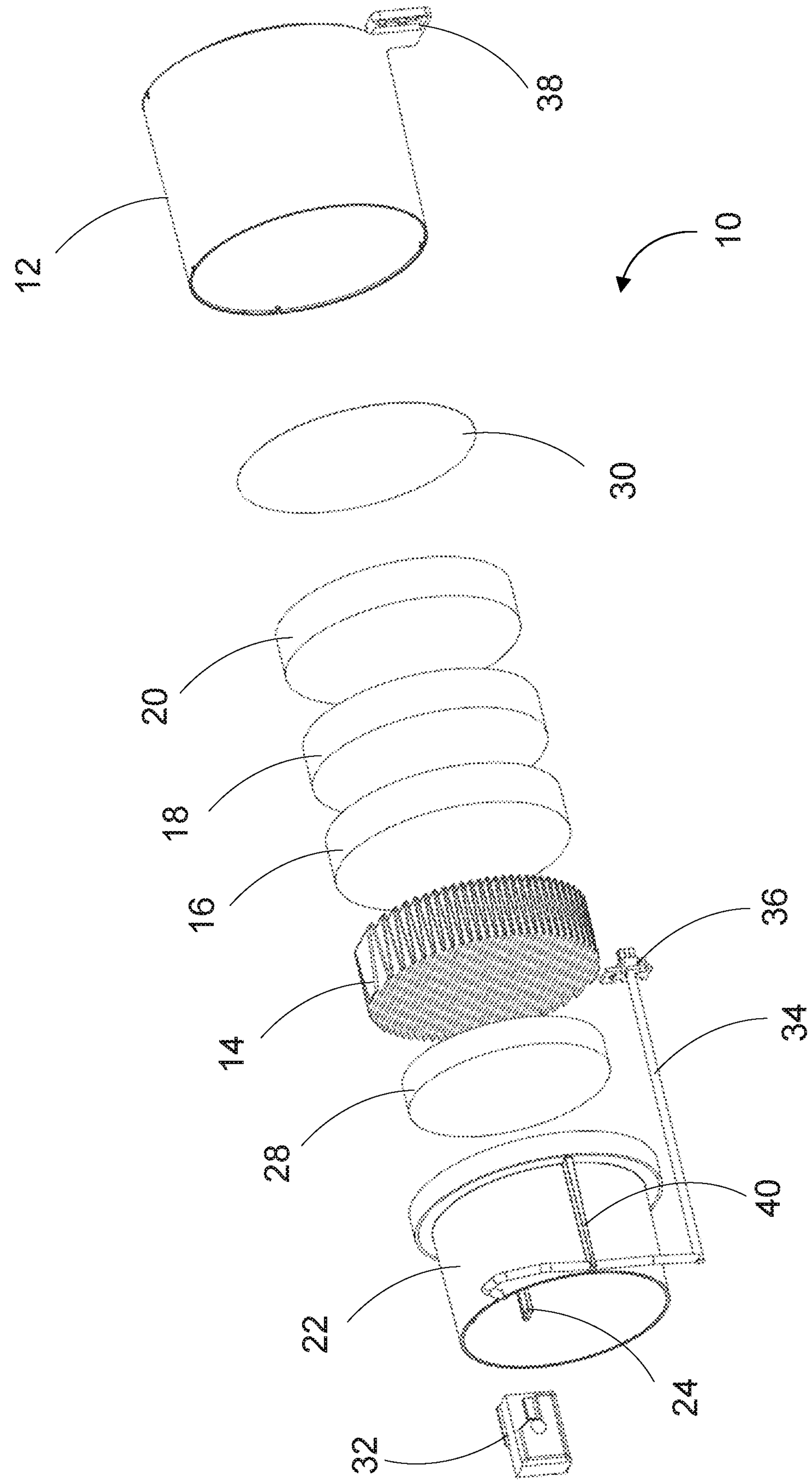
FIG. 2 is an exploded view of a filter system according to one embodiment. The exploded view shows a sensor, a sensor wire, a connection component, a main housing or main body, a liquid filter, a series of filters, a dust filter, and a filter body.
Figure 3A:
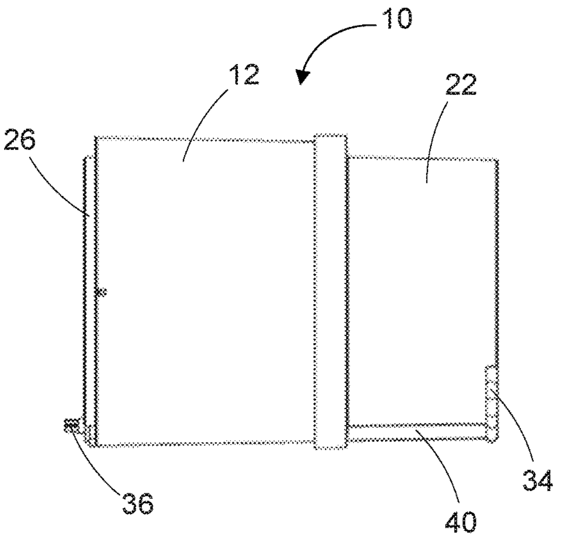
FIG. 3A is a side view of a filter system.
Figure 3B:
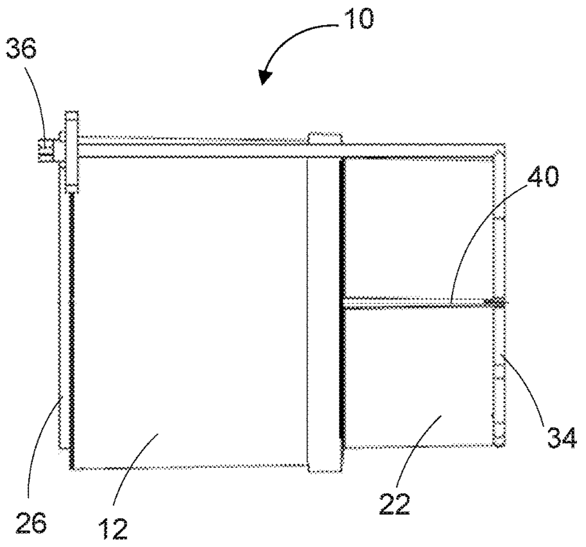
FIG. 3B is a further side view of the filter system.
Figure 3C:
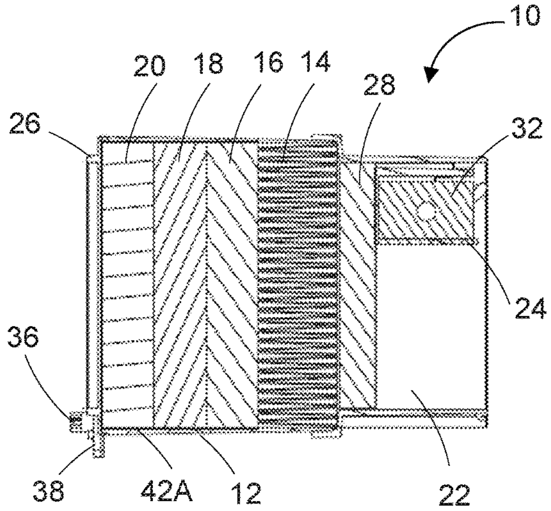
FIG. 3C is a side cross-sectional view of a filter system, according to one embodiment. The interior shows a liquid filter and sensor within a main body, and a particulate filter and three matrix filters within a filter body.
Figure 3D:
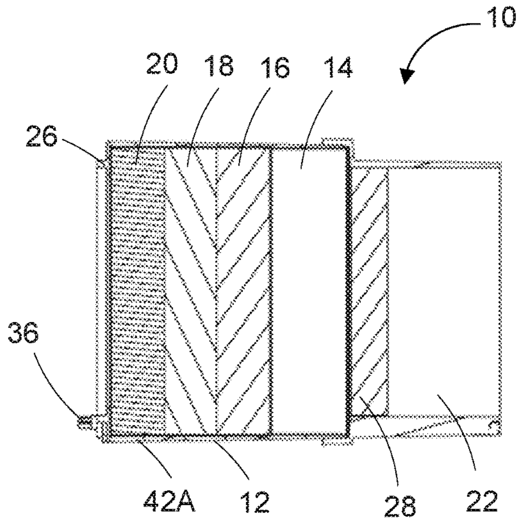
FIG. 3D is a further side cross-sectional view of the filter system, according to one embodiment.

In further embodiments, the main housing or main body 22 comprises a main body lumen defined through the main body, a sensor receiving housing 24 disposed within the lumen of the main housing 22. The sensor receiving housing 24 is capable of receiving and holding a sensor 32 within the main housing 22 (See sensor 32 in FIG. 2). As shown in FIG. 2, the sensor receiving housing is disposed within the lumen of the main body 22. In certain embodiments, the sensor 32 may detect smoke, vapors, and/or volatile organic compounds that flow through the filter system 10. In aspects, the placement of the sensor receiving housing 24 inside the main housing 22 eliminates additional structural components within the design of the filter system 10 to lower both cost of components as well as increase ease of assembly.

As further shown in FIG. 2, in embodiments, the filter system 10 may further comprise a sensor wire 34 operably coupled to the sensor receiving housing 24. In some aspects, the sensor wire 34 extends out of the main body 22. One end of the sensor wire is attached to the sensor 32, while the other end comprises a connection component 36 further disposed on the filter body 12 via a connector receiver 38. In some aspects, the sensor wire 34 is coupleable to the connection component 36.

In further embodiments, the filter housing or filter body 12 comprises a series of filters, 14, 16, 18, and 20. The interior filter, or particulate filter 14, is designed for particulate filtration and is disposed within the filter body lumen of the filter body 12. Examples of particulate filters that may be used include particulate filters manufactured by Flanders®. Additional commercially available particulate filters capable of nanofiltration may be further considered. As shown in FIG. 1 and FIG. 2, the three remaining filters, or matrix filters 16, 18, and 20, are capable of separating organic components within the vacuum stream. In certain embodiments, the matrix filters comprise a treated self-adhering carbon amalgamation matrix suitable for removing volatile organic compounds. FIG. 1 and FIG. 2 show the inclusion of three matrix filters according to one embodiment. In alternative embodiments, at least one matrix filter may be used, including a single matrix filter. In further embodiments, at least two matrix filters, or at least three matrix filters may be used. In some embodiments, the at least one matrix filter is an organic components filter. The at least one matrix filter (16, 18, or 20) may be disposed within the filter body lumen adjacent to the particulate filter 14 within the filter body 12. In some aspects, each of the matrix filters may be of the same design, or each of the matrix filters may be different depending on the organic and/or inorganic components that need to be collected or removed from the vacuum stream. In some aspects, the matrix filters are manufactured by Green Ladder Technologies, LLC.

As shown in FIG. 1 and FIG. 2, in some aspects, at least one matrix filter is present within the filter system 10. The at least one matrix filter may be disposed downstream of the particulate filter 14. In further embodiments, the filter system 10 may comprise at least two or at least three matrix filters disposed adjacent to each other in the filter body lumen. In some aspects, the particulate filter and the at least one matrix filter are configured to remove particulates, volatile organic compounds, and long chain organic compounds from air passing through the device. In some aspects, the long chain organic compounds may include, but are not limited to, proteins and enzymes.

In further aspects, the filter system 10 may comprise additional filters within the filter body 12. As shown in FIG. 2, the filter system 10 may further comprise a liquid filter 28. In some aspects, the liquid filter 28 is disposed in the main body 22 of the filter system 10. The liquid filter 28 may be further referred to as a pre-filter, as the liquid filter 28 is disposed in the main body 22 at a location that is upstream from the particulate filter 14. Due to the water sensitivities of the particulate filter 14, the liquid filter 28 helps to remove liquid components from the air coming through the filter system 10. In some embodiments, the liquid filter may comprise a polycloth filter.

As further shown in FIG. 2, the filter system 10 may further comprise a dust filter 30. In some aspects, the dust filter 30 may be disposed in the filter body lumen downstream of the at least one matrix filter (16, 18, or 20) within the filter body 12. Any suitable dust filter may be used, including materials from REEMAY®. In some aspects, the dust filter 30 is present to aid in collecting any remaining dust within the filter system 10.

Figure 4A:
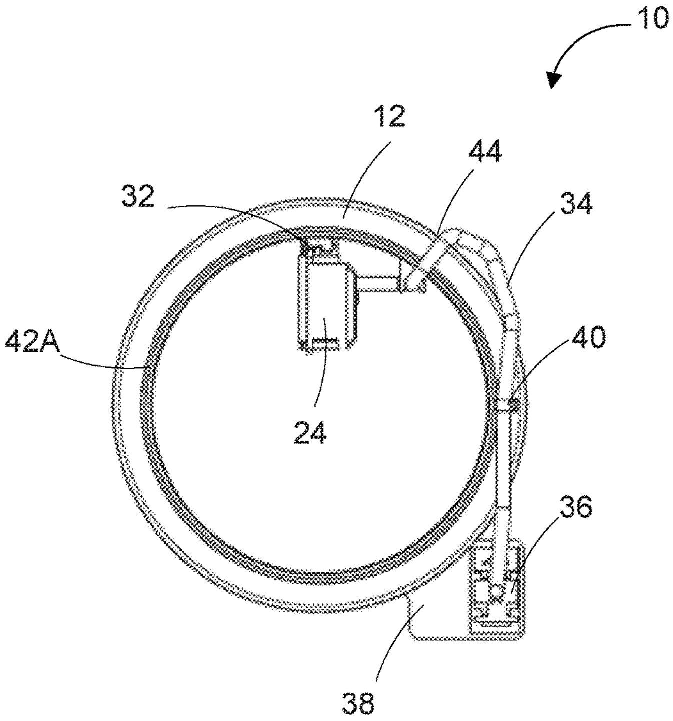
FIG. 4A is a top-to-bottom view of a filter system as viewed from upstream to downstream.
Figure 4B:
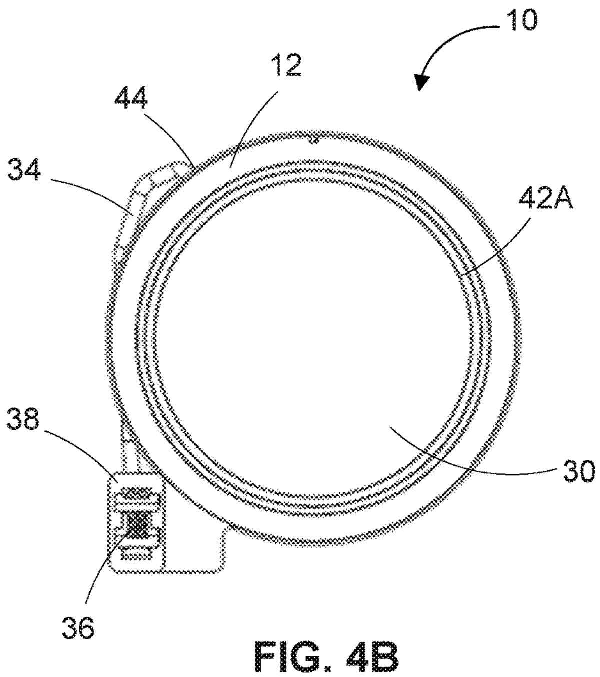
FIG. 4B is a bottom-to-top view of a filter system as viewed from downstream toward upstream.
Figure 5A:
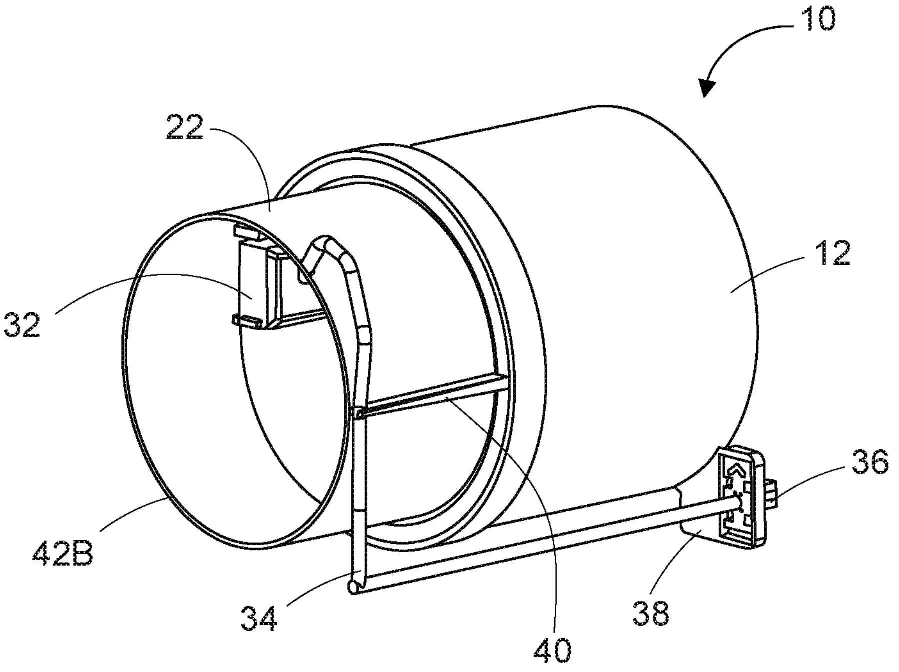
FIG. 5A is a perspective view of a filter system, showing the main body and filter body as they are fluidically sealed.
Figure 5B:
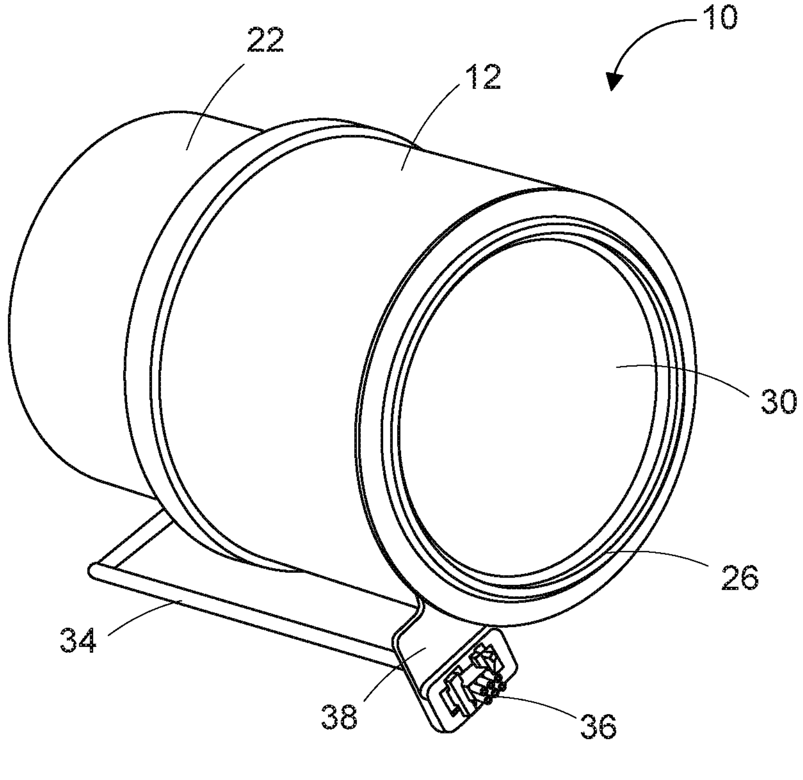
FIG. 5B is a further perspective view of a filter system showing the downstream end of the filter system.

FIG. 3A, FIG. 3B, FIG. 3C, and FIG. 3D show various views of the filtration system 10, including embodiments of how the filters and sensors are disposed about the filtration system 10. In some embodiments, and as shown in FIG. 3C, FIG. 3D, FIG. 4A, and FIG. 4B, the inside of the filter body 12 may comprise a sealant 42A to hold the filters within the filter body 12. In embodiments, once the filters are placed within the filter body 12, the filter is spun at high speed to seal the filters to the inside of the filter body 12 via the sealant 42A. FIG. 4A and FIG. 4B further provides a top-to-bottom and bottom-to-top view of the filtration system 10. As shown in FIG. 4A, the sensor wire 34 may be connected to the sensor 32 through a wire entry 44. The wire entry 44 may be disposed within the main body 22. As further shown in FIG. 2 and FIG. 4A, the sensor wire 34 may be attached to the outside of the main body 22 via a sensor wire holder 40. Additional views of the filter system 10 are further provided in FIG. 5A and FIG. 5B, which provides a two-dimensional representation of the filter system 10 in a three-dimensional space. FIG. 5A further shows a sealant 42B which may be disposed around the main body 22. The sealant 42B ensures that the filter system 10 is hermetically sealed with the face plate 48 as further described herein (see FIG. 6, for example).

Figure 6:
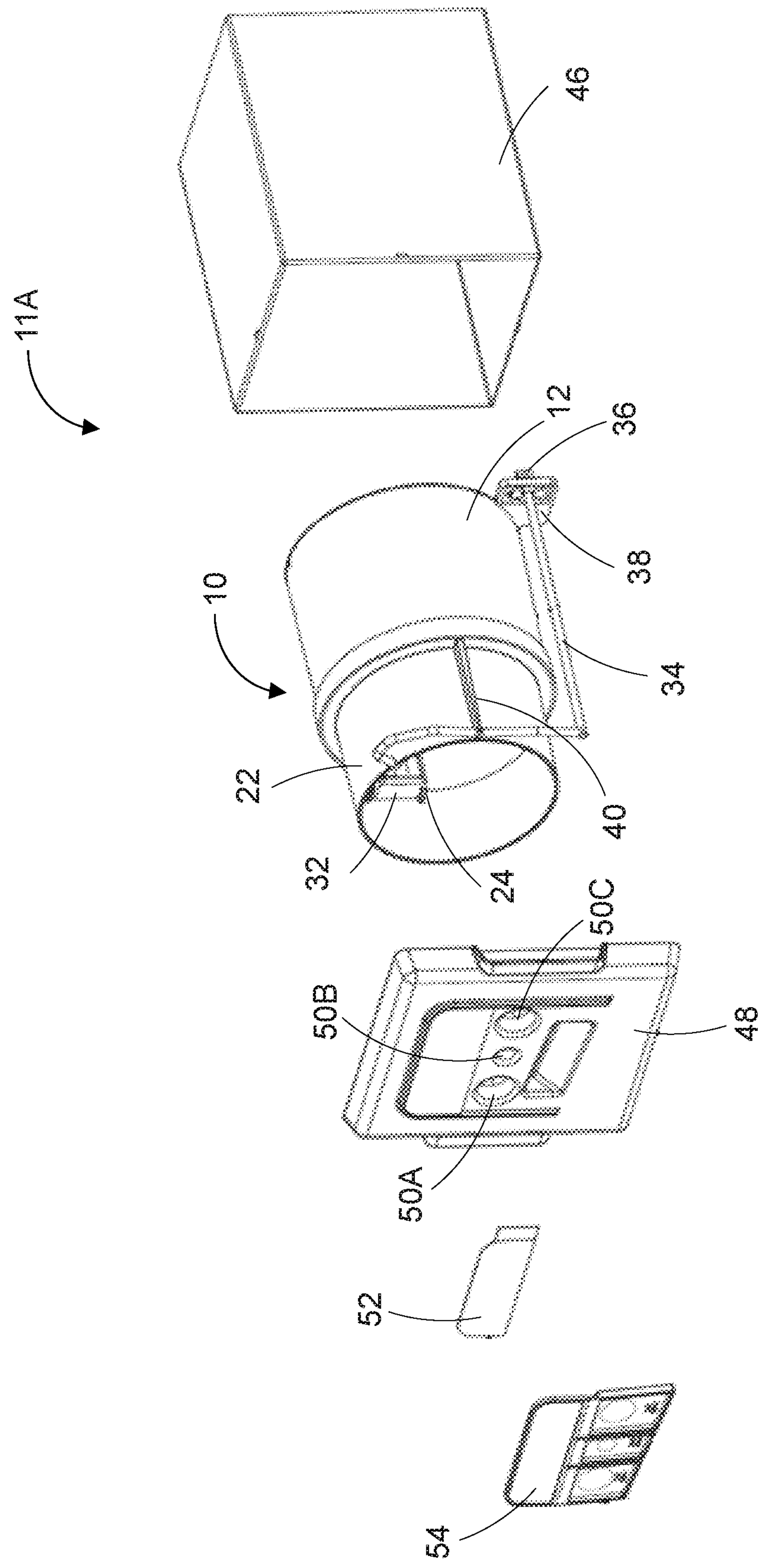
FIG. 6 is an exploded view of a filter compartment system comprising a filter system that is further enclosed by an outer housing configured to receive the main body and the filter body. The filter compartment system is shown to have a front-facing face plate according to one embodiment.

In certain embodiments, the filter system 10 is inserted within a larger vacuum unit (not shown within the figures). In some embodiments, the larger vacuum unit is a suction device used during surgery. During operation, an operator (such as, a surgeon) utilizes a device to seal a wound, where such a process may generate smoke, vapor, VOC, or a combination thereof. In certain embodiments, the larger vacuum unit comprises a suction device attached to a hose which may be used to collect the smoke, vapor, or VOC which are processed through the filter system 10. The smoke, vapor, and VOC pass through the suction hose and enters the main housing 22 which is further coupled to the filter housing 12 within a sealed compartment. As shown in FIG. 6, a filter compartment system 11A is further provided, which includes the filter system 10 as shown. In embodiments, the filter system 10 is enclosed by an outer housing configured to receive filter system 10 comprising the main body 22 and the filter body 12. As described herein, gasket 26 (not shown in FIG. 6) is configured to provide a fluidic seal or hermetic seal between a second end of the filter body 12 and the outer housing 46. The outer housing 46 is further coupled to a face plate 48.

In some aspects, the face plate 48 may be configured to receive the device utilized by the operator (such as, the surgeon). In some embodiments, the face plate 48 may receive a device, including but not limited to, a suction device attached to a hose to collect the smoke, vapor, VOC, or other fluidized particulate contaminates. The face place 48 may include one or more port holes (50A, 50B, or 50C). As shown in FIG. 6, three port holes are provided. However, the face plate 48 may comprise at least one port hole, at least two port holes, or at least three port holes (including more than three port holes). The face plate 48 may further comprise a face plate tap 52, which covers the port holes when not in use. If any excess port holes are not in use, the face plate tap 52 will cover the port hole openings. The face plate 48 and face plate tap 54 may be held together by a spacer 52, which may include double-sided adhesive to hold the components together.

Figure 7A:
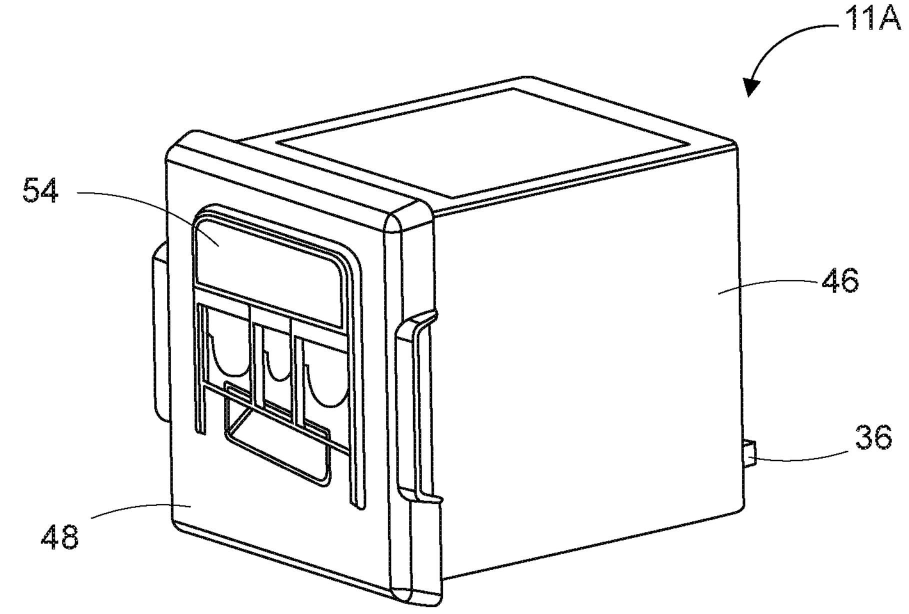
FIG. 7A is a perspective view of a filter compartment system, which shows a face plate for accepting medical devices for insertion into the filtration system.
Figure 7B:
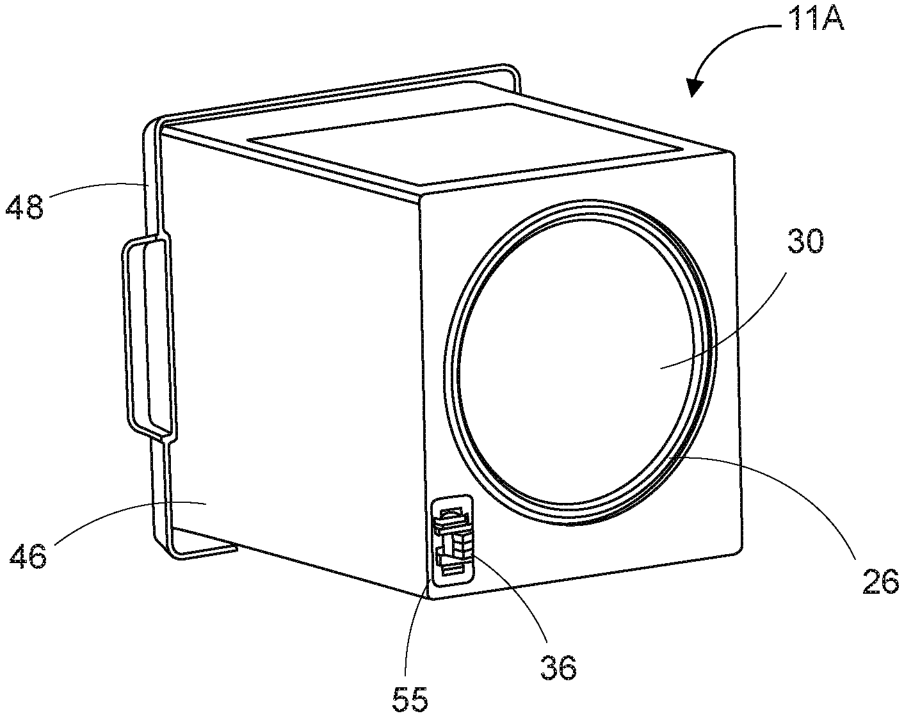
FIG. 7B is a further perspective view of a filter compartment system, which shows the downstream end of the filter compartment system.
Figure 8A:
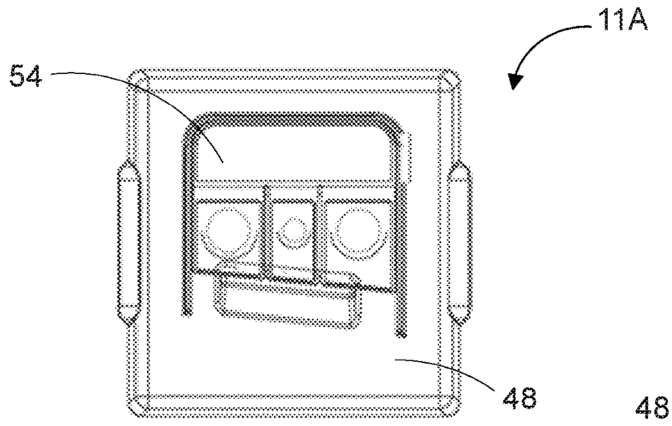
FIG. 8A is a front view of a filter compartment system, showing one embodiment of a face plate for receiving medical devices through the front end of the filter compartment system.
Figure 8B:
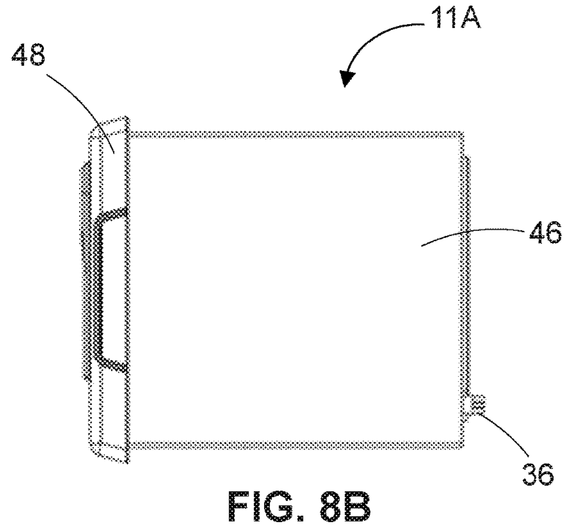
FIG. 8B is a side view of a filter compartment system.
Figure 8C:
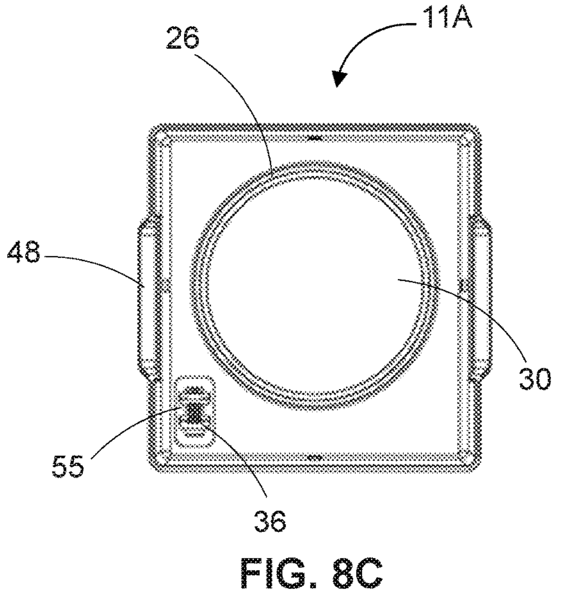
FIG. 8C is a back view, or downstream end, of a filter compartment system.
Figure 9A:
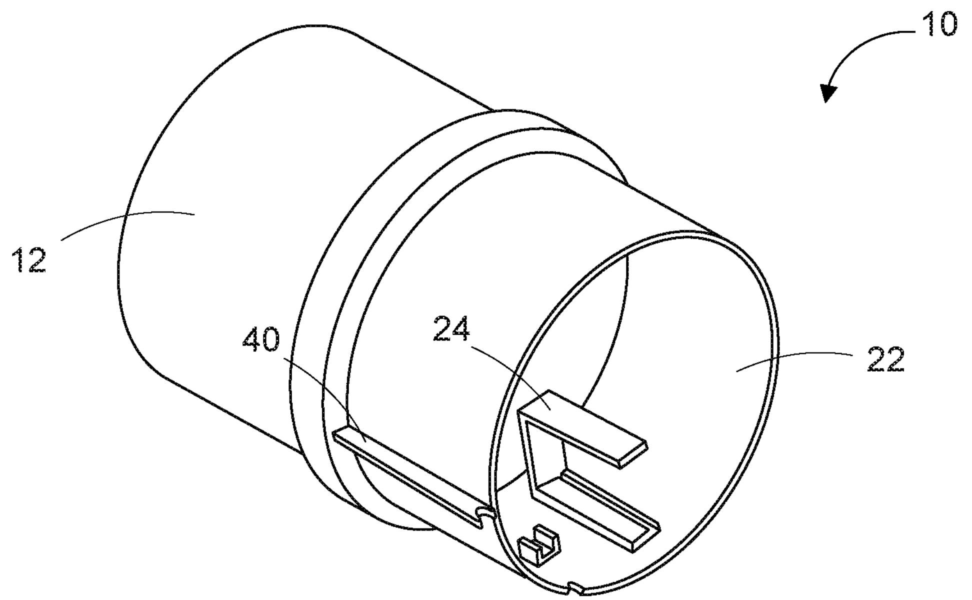
FIG. 9A shows a perspective view of a filter system without an outer housing.
Figure 9B:
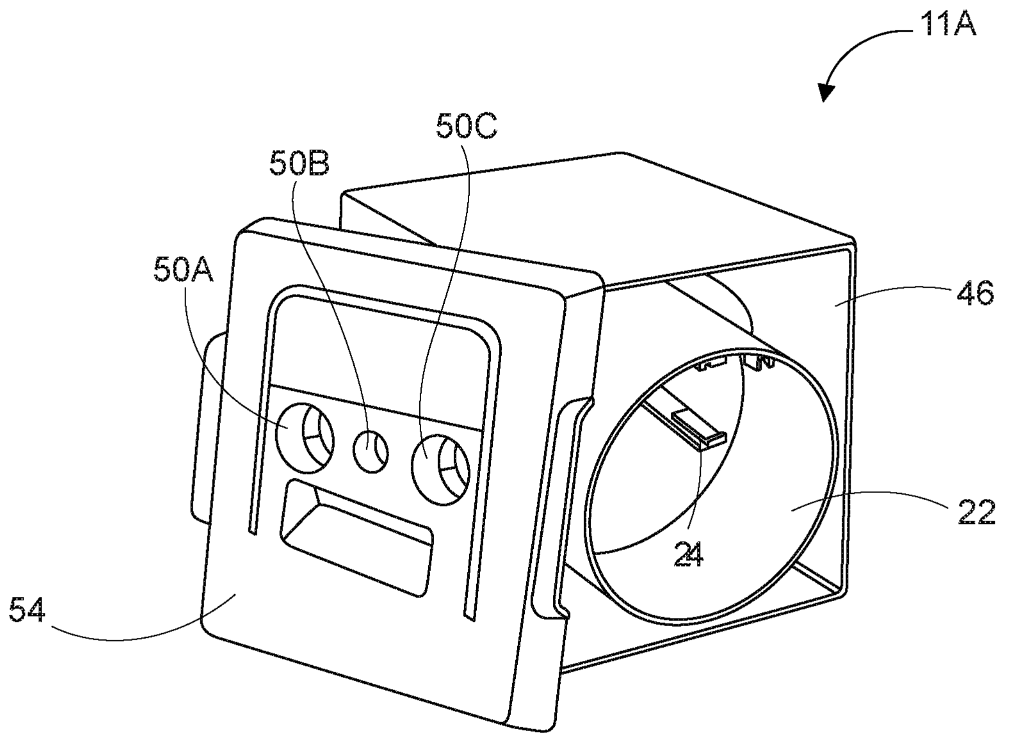
FIG. 9B shows a perspective view of a filter system with an outer housing to form a filter compartment system.

Further views of the filter compartment system 11A may be found in FIGS. 7A, 7B, 8A, 8B, and 8C. FIG. 7B and FIG. 8C further show how the connection component 36 is disposed within the filter compartment system 11A. The connection component 36 is fluidically sealed and protruded through the outer housing through a connector opening 55. FIG. 9A and FIG. 9B further show embodiments of how the filter system 10 fits into the outer housing 46 to form the filter compartment system 11A. As described herein, the filter compartment system 11A may be inserted within a larger vacuum unit. In some embodiments, if the sensor 32 within the sensor receiving housing 24 detects smoke, a vacuum motor (not shown in the figures) increases from low to high thus drawing in the smoke, vapor, fluidized particulate contaminants, and/or VOC's. The direction of the vacuum stream is shown via the arrows within FIG. 1.

Upon the vacuum stream entering the filter system 10, the vacuum stream is processed through the particulate filter 14 first, followed by the matrix filters (16, 18, and/or 20), resulting in the complete removal of all the smoke, vapor, fluidized particulate contaminants, VOC's, or a combination thereof present within the vacuum stream. As described herein, the vacuum stream may further be processed through a liquid filter 28 prior to being processed through the particulate filter 14. The vacuum stream may be further processed through a dust filter 30 after being processed through the at least one matrix filter (16, 18, and/or 20). In certain aspects, the filters 14, 16, 18, and 20 are disposed in a series as shown in FIG. 1 and FIG. 2. That is, the filters 14, 16, 18, and 20 are disposed adjacent to each other in the specific order as shown such that the components passing through the filter system 10 must pass through all filters 14, 16, 18, and 20 in order. Once the vacuum stream is passed through the filter system 10, the vacuum stream is processed through a fan assembly (not shown in the figures) and exits into the room in which the larger vacuum unit is held. Once the sensor 32 within the main housing 22 no longer detects smoke, the vacuum motor is reduced from high speed to low speed, or turned off.

Figure 10:
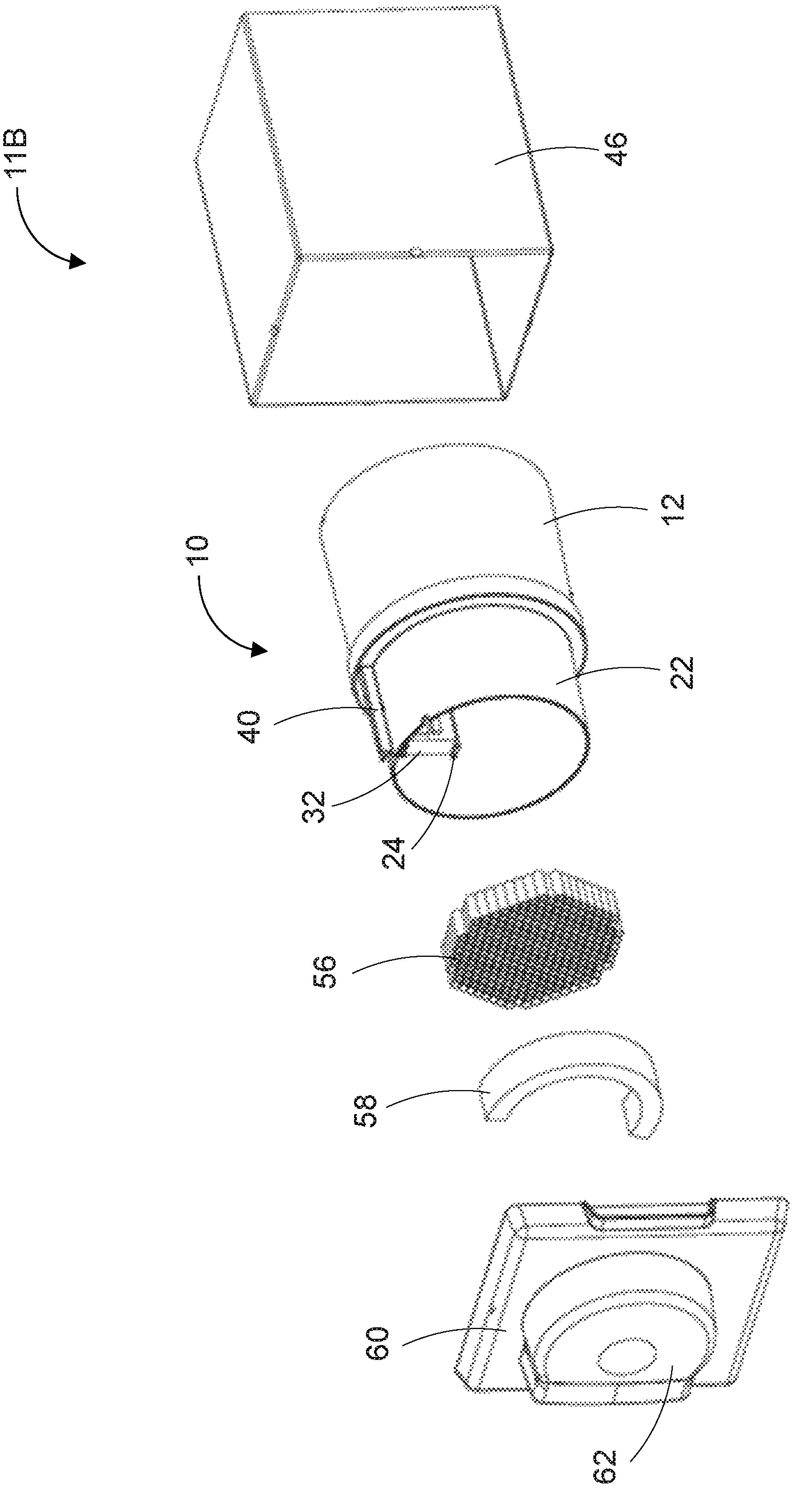
FIG. 10 shows an exploded view of a filter compartment system comprising a filter system that is further enclosed by an outer housing configured to receive the main body and the filter body. The filter compartment system is shown to have a 90-degree port face plate according to one embodiment. The 90-degree port face plate embodiment further comprises an air diffuser and fluid absorption pad.

In further embodiments, a 90-degree port can be used with the filter system 10 to condense the design of the filtration system in conjunction with an air damping system or fluid damping system to maintain even fluid flow through a series of filters. FIG. 10 shows a filter compartment system 11B which comprises the 90-degree port system. In embodiments, the filter compartment system 11B incorporates the same components as described herein for filter compartment system 11A. In aspects, filter system 10 as described herein is further incorporated into filter compartment system 11B. However, as shown in FIG. 10, filter compartment system 11B does not comprise the same face plate 48 as filter compartment system 11A. In embodiments of filter compartment system 11B, the vacuum stream flows through a 90-degree port 60 prior to entering the main housing or main body 22. In other embodiments, the vacuum stream flows through the 90-degree port 60 after exiting a filter housing or filter body 12 (not shown in the figures). Beneficially, the 90-degree port allows for the full utilization of the series of filters by preventing channeling.

As shown in FIG. 10, the 90-degree port 60 further comprises a 90-degree port compartment 62. The 90-degree port compartment 62 houses a fluid absorption pad 58. The fluid absorption pad 58 is placed upstream of an air diffuser 56 prior to entering the main body 22. In aspects, the 90-degree port 60 is configured to receive a device utilized by an operator (such as, the surgeon) as described herein. In some embodiments, the 90-degree port is at a 90-degree angle so that the filter compartment system 11B may receive the device, including but not limited to, a suction device attached to a hose to collect the smoke, vapor, VOC, or other fluidized particulate contaminates, at a 90-degree angle. Such embodiments are preferential if insertion via the front side of the filtration system or device is not available. However, due to the air current that generates from the 90-degree angle within the 90-degree port 60, an air diffuser 56 beneficially redirects the flow so that the flow becomes laminar before entering the main body 22 and contacting the sensor 32. This allows for more accurate readings from the sensor 32. The fluid absorption pad will further absorb fluid prior to being diffused through the air diffuser 56.

Figure 11A:
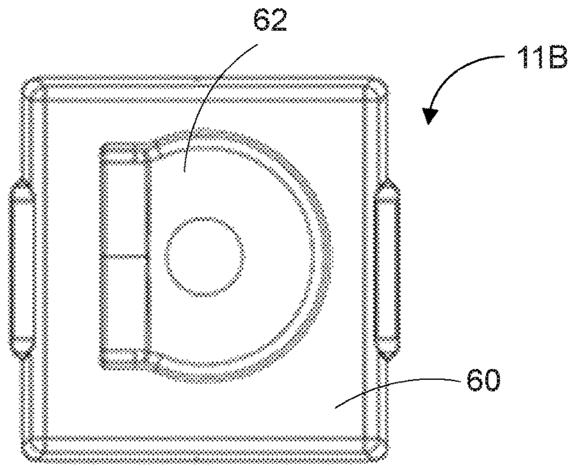
FIG. 11A shows a front view of a filter compartment system having a 90-degree port face plate.
Figure 11B:
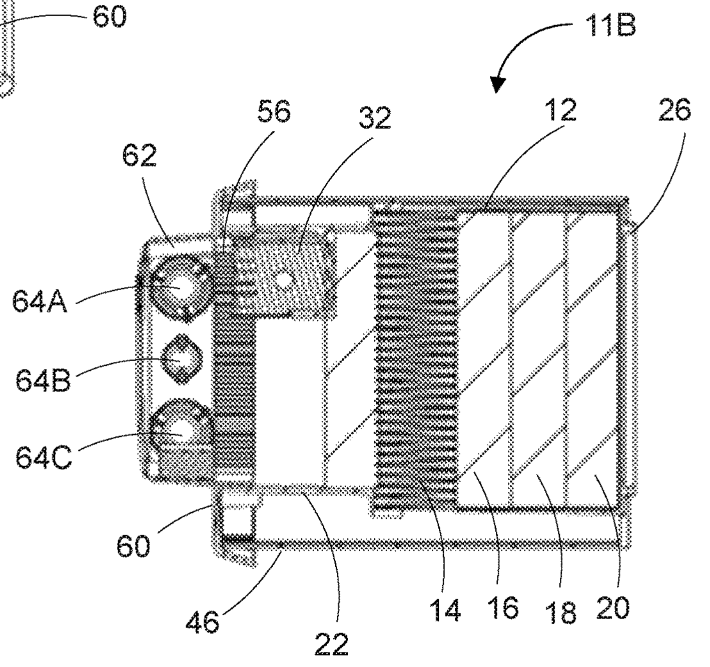
FIG. 11B shows a side cross-sectional view of a filter compartment system having a 90-degree port face plate and air diffuser.
Figure 11C:
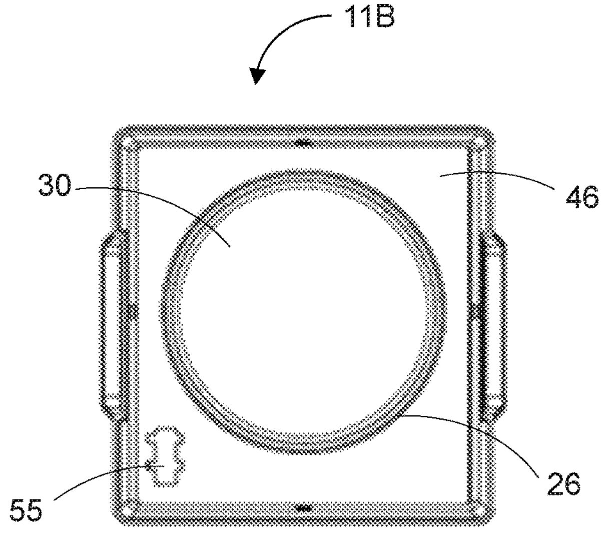
FIG. 11C shows a back view of a filter compartment system having a 90-degree port face plate.
Figure 12:
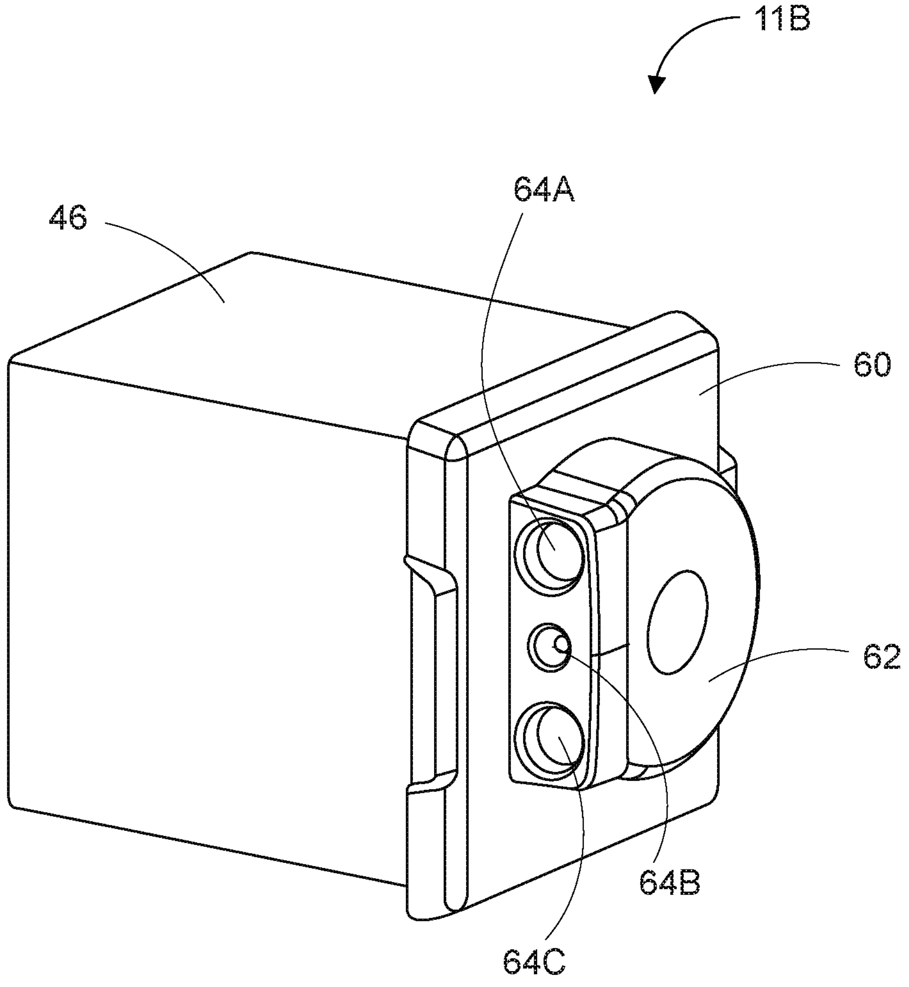
FIG. 12 shows a perspective view of a filter compartment system having a 90-degree port face plate.

Further embodiments of the 90-degree port and filter compartment system 11B are provided in FIG. 11A, 11B, 11C, and FIG. 12. As shown in FIG. 11B and FIG. 12, the 90-degree port 60 further comprises at least one 90-degree port holes (64A, 64B, and 64C). As shown in FIG. 11B and FIG. 12, three port holes are provided. However, the 90-degree port 60 may comprise at least one 90-degree port hole, at least two 90-degree port holes, or at least three 90-degree port holes (including more than three port holes).

Although the present disclosure has been described with reference to preferred embodiments, persons skilled in the art will recognize that changes may be made in form and detail without departing from the spirit and scope of the disclosure.

What is claimed is:

1. A medical air filtration device comprising:

(a) a main body comprising:

(i) a main body lumen defined through the main body;

(ii) a sensor receiving housing disposed within the lumen; and (iii) a coupling structure disposed at an end of the main body; and (b) a filter body comprising:

(i) a filter body lumen defined through the filter body;

(ii) a particulate filter disposed within the filter body lumen; and (iii) at least one matrix filter disposed within the filter body lumen adjacent the particulate filter, wherein the at least one matrix filter comprises a treated self-adhering carbon amalgamation matrix suitable for removing volatile organic compounds, wherein the filter body is removably coupleable with the coupling structure at a first end of the filter body such that the main body is fluidically sealed to the filter body and the filter body lumen is in fluidic communication with the main body lumen.

2. The medical air filtration device of claim 1, wherein the filter body further comprises a gasket fluidically sealed or hermetically sealed to a second end of the filter body.

3. The medical air filtration device of claim 2, further comprising an outer housing configured to receive the main body and the filter body, wherein the gasket is configured to provide a fluidic seal or hermetic seal between the second end of the filter body and the outer housing.

4. The medical air filtration device of claim 1, wherein the at least one matrix filter is disposed downstream of the particulate filter.

5. The medical air filtration device of claim 1, wherein the at least one matrix filter comprises three matrix filters disposed adjacent to each other in the filter body lumen.

6. The medical air filtration device of claim 1, further comprising a liquid filter disposed in the main body.

7. The medical air filtration device of claim 1, further comprising a remaining dust filter disposed in the filter body lumen downstream of the at least one matrix filter.

8. The medical air filtration device of claim 1, further comprising (a) a sensor wire operably coupled to the sensor receiving housing, wherein the sensor wire extends out of the main body; and (b) a connection component disposed on the filter body, wherein the sensor wire is coupleable to the connection component.

9. The medical air filtration device of claim 1, wherein the particulate filter is configured to remove particulates and the at least one matrix filter is configured to remove volatile organic compounds and long chain organic compounds from air passing through the device.

10. The medical air filtration device of claim 1, wherein the device is configured to be coupleable to and operable with a medical vacuum system.

11. The medical air filtration device of claim 1, wherein the filter body comprises a plastic material or polymeric material.

12. A medical air filtration system comprising:
(a) a main body comprising:
(i) a main body lumen defined through the main body;
(ii) a sensor receiving housing disposed within the lumen, the sensor receiving housing comprising a sensor configured to detect at least one of smoke, vapors, and volatile organic compounds flowing through the medical air filtration system;
(iii) a liquid filter disposed within the lumen; and
(iv) a coupling structure disposed at an end of the main body;
(b) a filter body comprising:
(i) a filter body lumen defined through the filter body;
(ii) a particulate filter disposed within the filter body lumen;
(iii) at least two organic component filters disposed within the filter body lumen adjacent to and downstream of the particulate filter wherein the at least two organic component filters comprise a treated self-adhering carbon amalgamation matrix suitable for removing volatile organic compounds; and
(iv) a dust filter disposed within the filter body lumen adjacent to and downstream of the at least two organic component filters,
wherein the filter body is removably coupleable with the coupling structure at a first end of the filter body such that the main body is fluidically sealed to the filter body and the filter body lumen is in fluidic communication with the main body lumen; and
(c) a vacuum unit comprising:
(i) a vacuum motor,
wherein, if the sensor detects at least one of smoke and volatile organic compounds flowing through the medical air filtration system, the vacuum motor is configured to increase from low to high, and
wherein, if the sensor does not detect at least one of smoke and volatile organic compounds flowing through the medical air filtration system, the vacuum motor is configured to reduce from high to low.

13. The medical air filtration system of claim 12, further comprising:
(a) a gasket fluidically sealed or hermetically sealed to a second end of the filter body; and
(b) an outer housing configured to receive the main body and the filter body, wherein the gasket is configured to provide a fluidic seal or hermetic seal between the second end of the filter body and the outer housing.

14. The medical air filtration system of claim 12, further comprising
(a) a sensor wire operably coupled to the sensor receiving housing, wherein the sensor wire extends out of the main body; and
(b) a connection component disposed on the filter body, wherein the sensor wire is coupleable to the connection component.

15. The medical air filtration system of claim 12, wherein the particulate filter is configured to remove particulates and the at least two organic component filters are configured to remove volatile organic compounds and long chain organic compounds from air passing through the system.

16. A medical vacuum and filtration system comprising:
(a) a medical suction device comprising a hose; and
(b) an air filtration device comprising:
(i) an outer housing;
(ii) a main body disposed within the outer housing, the main body comprising:
(A) a main body lumen defined through the main body;
(B) a sensor receiving housing disposed within the main body lumen; and
(C) a coupling structure disposed at an end of the main body,
wherein the hose is operably coupled to the main body such that an interior of the hose is in fluidic communication with the main body lumen; and
(iii) a filter body disposed within the outer housing, the filter body comprising:
(A) a filter body lumen defined through the filter body;
(B) a particulate filter disposed within the filter body lumen; and
(C) at least one matrix filter disposed within the filter body lumen adjacent the particulate filter, wherein the at least one matrix filter comprises a treated self-adhering carbon amalgamation matrix suitable for removing volatile organic compounds,
wherein the filter body is removably coupleable with the coupling structure at a first end of the filter body such that the main body is hermetically sealed to the filter body and the filter body lumen is in fluidic communication with the main body lumen.

17. The medical vacuum and filtration system of claim 16, further comprising:
(a) a liquid filter disposed in the main body; and
(b) a dust filter disposed in the filter body lumen downstream of the at least one matrix filter.

18. The medical vacuum and filtration system of claim 16, wherein the at least one matrix filter comprises three matrix filters disposed adjacent to each other in the filter body lumen, wherein the three matrix filters are organic components filters.

19. The medical vacuum and filtration system of claim 16, further comprising a gasket hermetically sealed to a second end of the filter body, wherein the gasket is configured to provide a hermetic seal between the second end of the filter body and the outer housing.

* * * * *